UNITED STATES PATENT OFFICE.

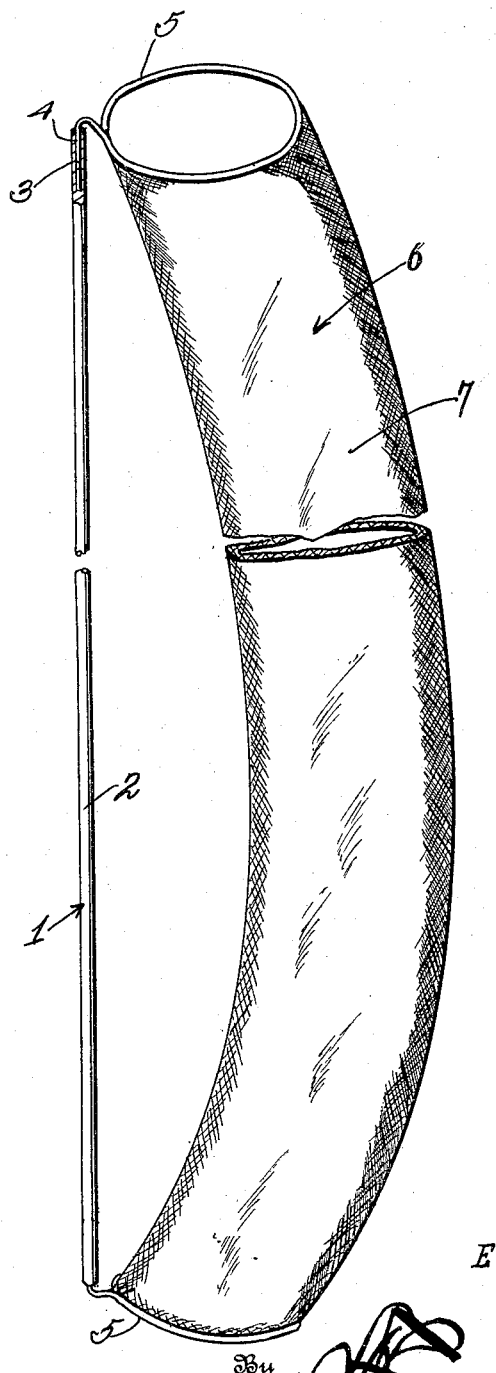

EDWARD F. HOWELL, OF FORT SMITH, ARKANSAS.

FRUIT-PICKER.

1,153,083.  Specification of Letters Patent.  Patented Sept. 7, 1915.

Application filed July 8, 1914. Serial No. 849,753.

*To all whom it may concern:*

Be it known that I, EDWARD F. HOWELL, a citizen of the United States, residing at Fort Smith, in the county of Sebastian and State of Arkansas, have invented certain new and useful Improvements in Fruit-Pickers; and I do hereby declare the following to be a full, clear, and exact description of the invention, such as will enable others skilled in the art to which it appertains to make and use the same.

This invention relates to new and useful improvements in fruit pickers, and has for its principal object to provide a fruit picker which is reversible, thus rendering the same capable of being used at either end.

Another object of the invention is to provide a simple and effective fruit picker wherein the fall of the fruit through the chute will be sufficiently cushioned and retarded to prevent the fruit from becoming injured.

A further object of the invention is to provide a simple and effective device which is carried on a rigid pole forming the handle and supporting the chute at each end.

With these and other objects in view, the invention consists in the novel combination and arrangement of parts which will be fully set forth in the following specification and accompanying drawings, in which, the drawing diagrammatically illustrates a fruit picker constructed in accordance with this invention.

Referring now to the drawings by characters of reference, the numeral 1 designates the handle member of the device which comprises the rigid bar 2, which is preferably cylindrical throughout its entire length. This rigid bar 2 is provided at each end with an internal bore 3 in which the hook member 4 of the ring 5 is inserted. This ring 5 forms the support for the chute which is designated generally by the numeral 6 and comprises the tubular flexible member 7, the upper and lower ends of which are arranged to surround the ring 5 and thereby be held firmly in place.

It will be apparent from the foregoing that in use the handle portion 1 is grasped and the upper end of the device raised so that the ring 5 encircles the fruit which is to be picked. The handle is also slightly inclined so that the chute will bulge away from to prevent the fruit in passing therethrough from being bruised by engagement with the handle. Upon slightly moving the ring it will be apparent that the fruit will be removed from the limb upon which it hangs and will fall through the chute 6 into the basket of the person using the same, which is not shown.

It will thus be seen that a simple and effective device is provided which may be reversed so that either end may be used to remove the fruit from the limb upon which it hangs, and due to the fact that the chute 6 is of greater length than the distance between the rings 5, it will be apparent that as the fruit falls the same will be retarded and prevented from becoming bruised or otherwise injured from sudden impact against the hard surface of the basket or other receptacle in which it is finally deposited. It will also be noticed that due to the peculiar construction of the device it is not necessary for the user to at any time touch the fruit, and thereby any danger of the fruit becoming marked from the contact with the person of the user is eliminated.

While in the foregoing there has been shown and described the preferred embodiment of this invention, it is to be understood that such changes may be made in the combination and arrangement of parts which will fall within the spirit and scope of the invention as defined in the appended claim.

Having thus described my invention, I claim:

In a reversible fruit picker, a handle of equal diameter throughout its entire length, a ring extending laterally from the handle at each end, an extension on each ring, said extension projecting radially therefrom and being secured to the handle to hold the rings at right angles thereto and in alinement with each other, and a chute of flexible material supported by and extending between the rings, said chute being of greater length than the distance between the rings so that it will bulge outwardly and away from the handle, thus preventing the fruit in passing therethrough from being bruised, the whole being adapted to be inverted so that either of the rings may be used as the mouth of the picker.

In testimony whereof I affix my signature in presence of two witnesses.

EDWARD F. HOWELL.

Witnesses:
G. N. CALLAHAN,
F. MOCK.

Copies of this patent may be obtained for five cents each, by addressing the "Commissioner of Patents, Washington, D. C."